(12) United States Patent
Yoshioka et al.

(10) Patent No.: US 12,378,625 B2
(45) Date of Patent: *Aug. 5, 2025

(54) STEEL SHEET, MEMBER, AND PRODUCTION METHODS THEREFOR

(71) Applicant: JFE Steel Corporation, Tokyo (JP)

(72) Inventors: Shimpei Yoshioka, Tokyo (JP);
Shinjiro Kaneko, Tokyo (JP); Yuma Honda, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 489 days.

This patent is subject to a terminal disclaimer.

(21) Appl. No.: 17/794,418

(22) PCT Filed: Jan. 21, 2021

(86) PCT No.: PCT/JP2021/001935
§ 371 (c)(1),
(2) Date: Jul. 21, 2022

(87) PCT Pub. No.: WO2021/153392
PCT Pub. Date: Aug. 5, 2021

(65) Prior Publication Data
US 2023/0069838 A1  Mar. 9, 2023

(30) Foreign Application Priority Data
Jan. 31, 2020 (JP) ................. 2020-014442

(51) Int. Cl.
*C21D 9/46* (2006.01)
*C21D 8/02* (2006.01)
(Continued)

(52) U.S. Cl.
CPC ............. *C21D 9/46* (2013.01); *C21D 8/0226* (2013.01); *C21D 8/0236* (2013.01);
(Continued)

(58) Field of Classification Search
CPC .......... B32B 15/013; C21D 1/18; C21D 1/19; C21D 1/22; C21D 2211/001;
(Continued)

(56) References Cited

U.S. PATENT DOCUMENTS

| 2018/0135145 A1 | 5/2018 | Suwa et al. |
| 2019/0017156 A1 | 1/2019 | Kawamura et al. |

(Continued)

FOREIGN PATENT DOCUMENTS

| CN | 107429349 A | 12/2017 |
| CN | 108603269 A | 9/2018 |

(Continued)

OTHER PUBLICATIONS

Extended European Search Report for European Application No. 21747814.8, dated Dec. 9, 2022, 11 pages.
(Continued)

*Primary Examiner* — Nicholas A Wang
(74) *Attorney, Agent, or Firm* — Buchanan Ingersoll & Rooney PC

(57) ABSTRACT

A steel sheet has a tensile strength of 1310 MPa or higher, a specified chemical composition, and a steel microstructure containing martensite at an area ratio of 70% or more, bainite at an area ratio of 30% or less, and ferrite and retained austenite at a total area ratio of 5% or less, in which, at a ¼ thickness position of the steel sheet, a number density of carbides having long axes of 0.5 μm or more is 60000 carbides/mm² or less, in a ¼-to-¾ thickness region of the steel sheet, a number density of inclusion grains having equivalent circle diameters of 4.0 μm or more is 10 grains/mm² or more and 30 grains/mm² or less, and, in a surface-to-¼ thickness region of the steel sheet, a number density of inclusion grains having equivalent circle diameters of 4.0 μm or more is 27 grains/mm² or less.

16 Claims, 2 Drawing Sheets

(51) Int. Cl.

| | |
|---|---|
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C23C 2/40* | (2006.01) |

(52) U.S. Cl.
CPC .......... *C21D 8/0273* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
CPC ........ C21D 2211/002; C21D 2211/004; C21D 2211/005; C21D 2211/008; C21D 2261/00; C21D 6/02; C21D 8/005; C21D 8/0205; C21D 8/021; C21D 8/0226; C21D 8/0236; C21D 8/0273; C21D 9/0068; C21D 9/46; C22C 38/001; C22C 38/002; C22C 38/005; C22C 38/008; C22C 38/02; C22C 38/04; C22C 38/06; C22C 38/12; C22C 38/14; C22C 38/16; C22C 38/18; C22C 38/32; C22C 38/60; C22C 38/42; C22C 38/44; C22C 38/46; C22C 38/58

See application file for complete search history.

(56) References Cited

U.S. PATENT DOCUMENTS

| | | |
|---|---|---|
| 2019/0203317 A1 | 7/2019 | Yoshioka et al. |
| 2021/0062288 A1 | 3/2021 | Nishio et al. |

FOREIGN PATENT DOCUMENTS

| | | |
|---|---|---|
| CN | 109642294 A | 4/2019 |
| EP | 1808505 A1 | 7/2007 |
| EP | 2258886 A1 | 12/2010 |
| EP | 2530179 A | 5/2012 |
| EP | 3202943 A1 | 8/2017 |
| EP | 3276022 A1 | 1/2018 |
| EP | 3416663 A1 | 12/2018 |
| EP | 3444372 A1 | 2/2019 |
| EP | 3489382 A1 | 5/2019 |
| EP | 4026922 A1 | 7/2022 |
| JP | 2010215958 A | 9/2010 |
| JP | 2010242164 A | 10/2010 |
| JP | 5136182 B2 | 2/2013 |
| JP | 6056790 B2 | 1/2017 |
| JP | 2017-168232 A | 9/2017 |
| JP | 6388085 B2 | 9/2018 |
| WO | 2006038708 A1 | 4/2006 |
| WO | 2009096344 A1 | 8/2009 |
| WO | 2011093319 A1 | 8/2011 |
| WO | 2012118081 A1 | 9/2012 |
| WO | 2017179372 A1 | 10/2017 |
| WO | 2018062381 A1 | 4/2018 |
| WO | 2018122679 A1 | 7/2018 |
| WO | 2018123356 A1 | 7/2018 |
| WO | 2019181950 A1 | 9/2019 |

OTHER PUBLICATIONS

Chinese Office Action with Search Report Application No. 202180010944.5, dated Feb. 18, 2023, 12 pages.
Office Action (Written Decision on Registration) issued Dec. 12, 2024, by the Korean Intellectual Property Office in corresponding Korean Patent Application No. 10-2022-7025465 and an English translation of the Office Action. (5 pages).
International Search Report and Written Opinion for International Application No. PCT/JP2021/001935, dated Apr. 13, 2021, 5 pages.
Nagataki et al., "Effect of Tempering Temperature on the Bendability of Martensitic Steels", Tetsu to Hagane, The Iron and Steel Institute of Japan, 2013, vol. 99, No. 3, pp. 245-253. (Abstract).
Office Action issued by the U.S. Patent and Trademark Office in the U.S. Appl. No. 17/794,431, mailed Mar. 12, 2025, U.S. Patent and Trademark Office, Alexandria, VA. (13 pages).

STEEL SHEET, MEMBER, AND PRODUCTION METHODS THEREFOR

CROSS REFERENCE TO RELATED APPLICATIONS

This is the U.S. National Phase application of PCT/JP2021/001935, filed Jan. 21, 2021, which claims priority to Japanese Patent Application No. 2020-014442, filed Jan. 31, 2020, the disclosures of each of these applications being incorporated herein by reference in their entireties for all purposes.

FIELD OF THE INVENTION

The present invention relates to a steel sheet, a member, and production methods therefor. In particular, the present invention relates to a steel sheet that has a tensile strength of 1310 MPa or higher and excellent edge cracking resistance and bendability, a member, and production methods therefor. The steel sheet according to aspects of the present invention is suitable for use in cold press forming that involves shearing and blanking processes.

BACKGROUND OF THE INVENTION

Growing needs for lighter automobile bodies in recent years have increased application of high strength steel sheets having a tensile strength (hereinafter, may simply be referred to as TS) of 1310 MPa or higher to car body frame parts. Furthermore, from the viewpoint of further weight reduction, studies on increasing the strength to 1.8 GPa-class or higher TS have been launched. Studies conducted thus far have extensively focused on increasing the strength by hot pressing; however, recently, application of high strength steel sheets for cold pressing is again brought to focus from the viewpoints of cost and productivity.

In order to more efficiently increase the strength of car body frames and obtain a weight reduction effect, it is effective to increase yield strength. A higher yield strength is easily obtained from a martensite microstructure than from relatively soft microstructures such as ferrite and bainite, and thus, in designing the microstructure of a high strength steel sheet, it is important that the martensite structure be the main structure.

However, a high strength steel sheet having a TS of 1310 MPa or higher may crack at the sheared edge if subjected to a process such as shear cutting or blanking. This crack is observed as a linear crack that is located near the center of the sheared edge in the sheet thickness direction and is parallel to or slanted with respect to the sheet surface, and this crack extends in the inner side of the sheet and has a length of several hundred micrometers. In the present description, such a crack may be referred to as an edge crack. In addition, in the present description, the capacity of a material to resist against such an edge crack may be referred to as edge cracking resistance. The edge crack shortens the tool life of a tool that comes into contact therewith. Moreover, the edge crack may cause an issue of inducing cracking in the subsequent press forming step, and may serve as a starting point of fatigue failure if the steel sheet is installed as a part in a car body, and thus has stalled the spread of the use of high strength steel sheets for cold rolling. Although edge cracks could be addressed by adjusting the process conditions such as shear clearance, in actual parts manufacturing, the shear clearance changes with time due to tool wear as well as the influence of the increased strength of the workpiece. Thus, it is difficult to stably obtain a normal sheared edge in a high strength steel sheet having a TS of 1310 MPa or higher.

Patent Literature 1 discloses a steel sheet that has excellent delayed fracture resistance at the sheared edge and a TS of 1320 MPa or higher, in which the area ratio of martensite and bainite relative to the entire microstructure is 95% or more and 100% or less in total, the balance is one or both of ferrite and retained austenite, the average grain size of prior austenite grains is more than 5 μm, and the number of inclusion groups having long axes of 20 to 80 μm in length is 5 groups/mm$^2$ or less.

Patent Literature 2 discloses a technology related to a steel sheet that undergoes less property deterioration after cutting, in which the steel microstructure is mainly composed of ferrite and bainite, the Mn segregation degree in the sheet thickness direction (center Mn peak concentration/average Mn concentration) is 1.20 or less, the width of the Mn segregation band in the sheet thickness direction is 43 μm or less, and the TS is 540 MPa or higher.

Patent Literature 3 discloses a technology related to a hot rolled steel sheet having a TS of 980 MPa or higher and having a microstructure in which a bainite phase accounts for 90% or more in terms of area ratio, the number-based ratio of Fe carbides precipitating in bainitic ferrite grains among all Fe carbides precipitating in the bainite phase is 30% or more, the average grain diameter of the Fe carbides precipitating in the bainitic ferrite grains is 150 nm or less, and the solid solution V content in the steel is 0.100% or more in terms of mass %.

PATENT LITERATURE

PTL 1: Japanese Patent No. 6388085
PTL 2: Japanese Patent No. 5136182
PTL 3: Japanese Patent No. 6056790

NON PATENT LITERATURE

NPL 1: NAGATAKI Yasunobu, TSUYAMA Seishi, HOSOYA Yoshihiro, "Effect of Tempering Temperature on the Bendability of Martensitic Steels", Tetsu to Hagane, The Iron and Steel Institute of Japan, 2013, vol. 99, No. 3, pp. 245-253

SUMMARY OF THE INVENTION

However, according to the technology described in Patent Literature 1, although the inclusions that serve as starting points of delayed fracture after shearing are sufficiently decreased, small cracks several hundred micrometers in size formed in the sheared edge by shearing are not suppressed. Furthermore, according to Patent Literature 2, the TS is 540 MPa or higher, and ferrite and bainite are the main phases; thus, there is no guarantee that the Mn segregation reduction effect specified in Patent Literature 2 would be sufficient for the steel sheet according to aspects of the present invention that has a 1310 MPa-class TS and martensite as the main phase. Actually, the inventors have investigated the state of occurrence of edge cracks in detail, and found that the cracks do not necessarily run along the segregation band of Mn or the like, and there were few cracks that run along regions with relatively less segregation. Accordingly, it is highly possible that suppressing edge cracks formed by shearing would be difficult by merely combining Patent Literature 1 and Patent Literature 2. Patent Literature 3 discloses a technology of accelerating division of a material during shearing by using carbides in a steel that has a main phase formed of bainite. Meanwhile, Non Patent Literature 1 discloses that precipitation of coarse carbides in a steel having a main phase formed of martensite degrades bendability.

In view of the above, according to the existing technologies, it is difficult to stably obtain a normal sheared edge in a high strength steel sheet having a main phase formed of martensite.

Aspects of the present invention have been made under such circumstances and aim to provide a steel sheet that has a TS of 1310 MPa or higher and excellent edge cracking resistance and bendability, a member, and production methods therefor.

It should be noted that, in accordance with aspects of the present invention, the TS is determined by cutting out a JIS No. 5 tensile test specimen in such a manner that a direction orthogonal to the rolling direction is the longitudinal direction, and subjecting the test specimen to a tensile test in accordance with JIS Z 2241 (2011) at a crosshead speed of 10 mm/min.

Furthermore, excellent bendability means that when a JIS No. 3 test specimen is taken from a steel sheet such that the longitudinal direction is the direction (coil width direction) orthogonal to the rolling direction and is subjected to a 90° V bend test by a V block method in accordance with JIS Z 2248 while varying the bending radius, the value (R/t) obtained by dividing the minimum bending radius R that does not generate cracks in the test specimen surface by the sheet thickness t is 4.0 or less.

Moreover, excellent edge cracking resistance means that the proportion of the observation test specimens with edge cracking determined by the following method is less than 50%.

(1) A test specimen 110 mm long in the rolling direction and 500 mm long in the direction orthogonal to the rolling direction is cut out from a center portion of a steel sheet in a direction (transverse direction) orthogonal to the rolling direction.

(2) By using a cutting machine, the test specimen held between a lower blade and a sheet holder is sheared by bringing an upper blade down (shearing conditions are that the clearance CL is 15% of the sheet thickness t and the shear angle (the slope with respect to the sheet surface of the steel sheet) is 0°).

(3) Under the aforementioned shearing conditions, the test specimen is sheared five times at 30 mm intervals in the direction orthogonal to the rolling direction so as to obtain five strip-shaped test specimens each having a sheared surface which has been facing the upper blade during shearing.

(4) The aforementioned five strip-shaped test specimens are each divided into eleven pieces by cutting at 10 mm intervals in the rolling direction.

(5) Of the eleven strip-shaped test specimens obtained by the cutting, ten test specimens are used as observation test specimens, and a total of fifty test specimen are used in observation of the edge cracks.

(6) The sheared surfaces of the observation test specimens are polished but unetched, and presence/absence of the edge cracks is observed with an optical microscope from the thickness surface side.

(7) An observation test specimen that has at least one crack extending 30 μm or more from the surface of the sheared surface in the depth direction is judged as having edge cracking.

The inventors of the present invention have conducted extensive researches to find a solution to the aforementioned issues. The inventors have then found that a steel sheet that has a tensile strength of 1310 MPa or higher and excellent edge cracking resistance and bendability can be obtained when the steel sheet has a specified chemical composition and a specified steel microstructure, when the number densities of particular inclusion grains near the center of the steel sheet in the thickness direction and near the surface of the steel sheet are appropriately controlled, and when the number density of particular carbides is controlled. Specifically, the findings of the inventors of the present invention are as follows.

(1) Edge cracks form near the center in the sheet thickness direction, and when a specified amount of inclusions having an equivalent circle diameter of 4.0 μm or more are contained near the center in the thickness direction, cracking of the sheared edge that occurs during shearing is suppressed even in a high strength steel. This is presumably because, during shearing, microcracks occur from the inclusions as starting points, and become connected to each other along the surface parallel to the sheet thickness direction, and thus a fracture surface with fewer edge cracks is formed. In contrast, when there are fewer inclusions present near the center in the sheet thickness direction, the intervals between the inclusions are large, the aforementioned effect is not achieved, and cracks tend to propagate in various directions. Thus, when there are fewer inclusions near the center in the sheet thickness direction, cracks tend to propagate toward the interior (a direction intersecting the surface parallel to the sheet thickness direction) of the fracture surface of the steel sheet, and edge cracks are more likely to occur.

(2) A particular amount of the aforementioned inclusions are to be present near the center in the sheet thickness direction where edge cracks may occur. Furthermore, when inclusions are present in the steel sheet surface layer, it is possible that cracking would be accelerated during bending. Thus, there are an upper limit to the number density of the inclusions and a preferable sheet thickness-direction distribution of the inclusions. It has been found from the extensive investigations of the present inventors that there are critical values that do not adversely affect the bendability for the number densities of the inclusions in the region that extends from the surface layer of the steel sheet to the ¼ thickness position and in the region that extends from the ¼ thickness position to the ¾ thickness position.

(3) One production factor that affects the number density of inclusions is the slab heating step in hot rolling. Heating the slab at high temperature accelerates dissolution of coarse inclusions; however, in order to achieve the aforementioned inclusion distribution, existing administration of the slab heating conditions is insufficient, and thus the temperature distribution inside the slab in the thickness direction must be controlled by stringently controlling the heating conditions.

(4) In addition to the aforementioned conditions, by appropriately controlling the number density of the carbides in the steel, both excellent edge cracking resistance and excellent bendability can be achieved.

Aspects of the present invention have been made on the basis of these findings, and the summary of aspects of the present invention is as follows.

[1] A steel sheet having a tensile strength of 1310 MPa or higher, which has:
a chemical composition containing, in terms of mass %,
C: 0.12% or more and 0.40% or less,
Si: 0.01% or more and 1.5% or less,
Mn: 0.2% or more and 1.7% or less, P: 0.05% or less,
S: 0.010% or less,
sol. Al: 1.00% or less,
N: 0.010% or less,
B: 0.0002% or more and 0.0050% or less,
at least one selected from Nb and Ti: 0.010% or more and 0.080% or less in total, and the balance being Fe and incidental impurities; and
a steel microstructure containing martensite at an area ratio of 70% or more, bainite at an area ratio of 30% or less, and ferrite and retained austenite at a total area ratio of 5% or less,
in which:
at a ¼ thickness position of the steel sheet, a number density of carbides having long axes of 0.5 μm or more is 60000 carbides/mm$^2$ or less,
in a ¼-to-¾ thickness region of the steel sheet, a number density of inclusion grains having equivalent circle diameters of 4.0 μm or more is 10 grains/mm$^2$ or more and 30 grains/mm$^2$ or less, and
in a surface-to-¼ thickness region of the steel sheet, a number density of inclusion grains having equivalent circle diameters of 4.0 μm or more is 27 grains/mm$^2$ or less.

[2] The steel sheet described in [1], in which the chemical composition further includes, in terms of mass %, at least one selected from the group consisting of:
Mo: 0.350% or less,
Cr: 0.350% or less,
Zr: 0.350% or less,
Ca: 0.0050% or less,
V: 0.500% or less,
W: 0.200% or less,
Cu: 1.00% or less,
Ni: 1.00% or less,
Sb: 0.100% or less,
Sn: 0.100% or less,
Mg: 0.01% or less, and
REM: 0.01% or less.

[3] The steel sheet described in [1] or [2], in which a coating layer is disposed on a surface of the steel sheet.

[4] A member which is obtained by subjecting the steel sheet described in any one of [1] to [3] to at least one selected from forming and welding.

[5] A method for producing a steel sheet, which includes:
a slab heating step that involves heating a slab having the chemical composition described in [1] or [2] under such conditions that an average heating rate in a slab surface temperature range from 300° C. to 1220° C. is 0.10° C./s or more and that an average temperature ratio (Tc/Ts) of a slab center temperature Tc to a slab surface temperature Ts in this temperature range is 0.85 or less, and then holding the resulting slab under such conditions that a slab surface temperature of 1220° C. or higher is held for 30 minutes or longer and a slab center temperature of 1220° C. or higher is held for 30 minutes or shorter;
a hot rolling step of hot-rolling the slab that has been subjected to the slab heating step so as to produce a hot rolled steel sheet;
a cold rolling step of cold-rolling the hot rolled steel sheet into a cold rolled steel sheet; and
an annealing step of holding the cold rolled steel sheet at an annealing temperature of 800° C. or higher for 240 seconds or longer, then cooling the annealed steel sheet at an average cooling rate of 70° C./s or more in a temperature range from a cooling start temperature of 680° C. or higher to 300° C., and then holding the resulting steel sheet in a temperature range of 150° C. or higher and 260° C. or lower for 20 seconds or longer and 1500 seconds or shorter.

[6] The method for producing a steel sheet described in [5], which further includes a coating step of coating a surface of the steel sheet after the annealing step.

[7] A method for producing a member, which includes a step of subjecting a steel sheet produced by the method for producing a steel sheet described in [5] or [6] at least one selected from forming and welding.

The steel sheet according to aspects of the present invention has a tensile strength of 1310 MPa or higher and excellent edge cracking resistance and bendability. The steel sheet according to aspects of the present invention is suitable for use in cold press forming that involves shearing and blanking processes, and contributes to improved part strength and weight reduction.

DETAILED DESCRIPTION OF EMBODIMENTS OF THE INVENTION

Figure 1:
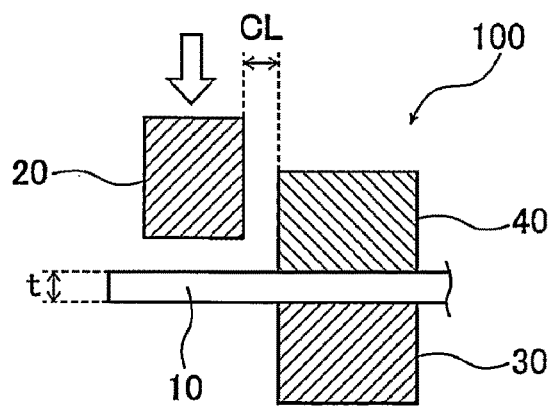
FIG. 1 is a schematic cross sectional view of a cutting machine.

The embodiments of the present invention will now be described. First, the contents of the respective components contained in a steel sheet are described. "%" indicating the content of a component means "mass %".

C: 0.12% or more and 0.40% or less
Carbon (C) is contained to improve hardenability and obtain a martensite structure at an area ratio of 70% or more. Furthermore, C is contained to increase the strength of martensite or bainite and to secure TS≥1310 MPa. In addition, C is contained to generate inclusions having an equivalent circle diameter of 4.0 μm or more. At a C content of less than 0.12%, the tempering temperature must be excessively decreased, and the specified strength cannot be obtained while maintaining excellent edge cracking resistance. Thus, the C content is 0.12% or more. From the viewpoints of maintaining excellent edge cracking resistance and obtaining TS≥1400 MPa, the C content is preferably 0.18% or more. At a C content exceeding 0.40%, the strength increases excessively, and thus the toughness decreases and it becomes difficult to obtain sufficient edge cracking resistance. In addition, at a C content exceeding 0.40%, the bendability is also deteriorated. Thus, the C content is 0.40% or less and preferably 0.36% or less.

Si: 0.01% or more and 1.5% or less
Silicon (Si) is a strengthening element for solid solution strengthening. In addition, Si is an element that suppresses generation of film-shaped carbides in tempering in the temperature range of 200° C. or higher and improves the bendability. From the viewpoint of obtaining the aforementioned effects, the Si content is 0.01% or more, preferably 0.02% or more, and more preferably 0.1% or more. Meanwhile, at an excessively high Si content, the toughness is degraded, and the edge cracking resistance is deteriorated.

Furthermore, in the hot rolling step, the rolling load increases notably. Thus, the Si content is 1.5% or less and preferably 1.0% or less.

Mn: 0.2% or more and 1.7% or less

Manganese (Mn) improves hardenability of the steel and is contained to adjust the area ratio of martensite to be within the range according to aspects of the present invention. In addition, Mn is contained to immobilize S in the steel as MnS and to reduce hot shortness. In order to industrially reliably obtain a specified total area ratio of martensite and bainite, the Mn content is 0.2% or more and preferably 0.6% or more. However, for the purpose of obtaining welding stability, the Mn content is 1.7% or less, preferably 1.6% or less, and more preferably 1.5% or less.

P: 0.05% or less

Phosphorus (P) is an element that strengthens the steel, but at a high P content, toughness is degraded, and the edge cracking resistance and the spot weldability are deteriorated. Thus, the P content is 0.05% or less and preferably 0.02% or less. Although the lower limit of the P content is not specified, the practically industrially feasible lower limit is 0.002% at the current.

S: 0.010% or less

Sulfur (S) deteriorates bendability through formation of coarse MnS, and thus the S content is 0.010% or less, preferably 0.005% or less, and more preferably 0.002% or less. At a S content exceeding 0.010%, the edge cracking resistance is also deteriorated. Although the lower limit of the S content is not specified, the practically industrially feasible lower limit is 0.0002% at the current.

Sol. Al: 1.00% or less

Aluminum (Al) is contained to perform sufficient deoxidization and reduce inclusions in the steel. The lower limit of the sol. Al content is not particularly limited, but is preferably 0.01% or more to stably perform deoxidization. Meanwhile, when the sol. Al content exceeds 1.00%, a large amount of coarse Al inclusions are generated, and thus the bendability is deteriorated. Thus, the sol. Al content is 1.00% or less. The sol. Al content is preferably 0.50% or less and more preferably 0.10% or less.

N: 0.010% or less

Nitrogen (N) forms coarse nitrides and deteriorates the bendability; thus, its content must be regulated. Thus, the N content is 0.010% or less and preferably 0.005% or less. Although the lower limit of the N content is not specified, the practically industrially feasible lower limit is 0.0005% at the current.

B: 0.0002% or more and 0.0050% or less

Boron (B) is an element that improves the hardenability, and offers an advantage in that even a small amount of Mn helps generate the specified area ratios of martensite and bainite. In order to obtain such an effect of B, the B content is 0.0002% or more, and preferably 0.0005% or more. Meanwhile, at a B content exceeding 0.0050%, the effect thereof saturates. Thus, the B content is 0.0050% or less and preferably 0.0030% or less.

At least one selected from Nb and Ti, in a total of 0.010% or more and 0.080% or less Niobium (Nb) and titanium (Ti) contribute to increasing strength through refinement of the internal structure of the martensite, form carbonitrides, and improve edge cracking resistance. As for the carbonitrides, TiN, TiC, NbC, NbN, etc. may exist on their own, or two or more of these may combine to form one inclusion. According to the research done by the present inventors, there is no clear correlation between the chemical composition of the inclusions and the likelihood of the edge cracking; thus, Nb and Ti may be added alone or together. From the viewpoint of obtaining the aforementioned effect, the total content of at least one selected from Nb and Ti is 0.010% or more, and preferably 0.025% or more. Meanwhile, an excessively high Nb or Ti content increases the inclusion density near the surface of the steel sheet despite optimization of the slab heating conditions, etc., and deteriorates the bendability. Thus, the total content of at least one selected from Nb and Ti is 0.080% or less, preferably 0.060% or less, and more preferably 0.055% or less.

The aforementioned are the basic components of the steel sheet used in accordance with aspects of the present invention. The steel sheet used in accordance with aspects of the present invention has a chemical composition that contains the aforementioned basic components, and the balance other than the aforementioned components is iron (Fe) and incidental impurities. Here, the steel sheet according to aspects of the present invention preferably has a chemical composition containing the aforementioned components and the balance being Fe and incidental impurities. The steel sheet according to aspects of the present invention may contain, in addition to the aforementioned basic components, at least one of optional components described below. Note that the effects according to aspects of the present invention are obtained as long as the optional components described below are contained in an amount that does not exceed the upper limit described below; thus, the lower limit is not particularly set. It should be understood that when any of the following optional elements is contained in an amount less than the preferable lower limit described below, such an element is assumed to be an incidental impurity.

Mo: 0.350% or less

Molybdenum (Mo) improves the hardenability of the steel and can be added to obtain an effect of stably obtaining the specified strength, the effect of generating Mo-containing fine carbides that serve as hydrogen trapping sites, and an effect of improving the edge cracking resistance by refinement of martensite. However, at a Mo content exceeding 0.350%, the phosphatability is deteriorated. Thus, when Mo is to be contained in the steel sheet, the Mo content is 0.350% or less and preferably 0.10% or less.

The effects according to aspects of the present invention can be obtained as long as the Mo content is 0.350% or less, and thus the lower limit of the Mo content is not particularly limited. In order to more effectively obtain the effect of improving the edge cracking resistance, the Mo content is preferably 0.005% or more.

Cr: 0.350% or less

Chromium (Cr) can be added to obtain an effect of improving the hardenability of the steel. However, at a Cr content exceeding 0.350%, the phosphatability is deteriorated. Thus, when Cr is to be contained in the steel sheet, the Cr content is 0.350% or less and preferably 0.20% or less. The effects according to aspects of the present invention can be obtained as long as the Cr content is 0.350% or less, and thus the lower limit of the Cr content is not particularly limited. In order to more effectively obtain the effect of improving the edge cracking resistance, the Cr content is preferably 0.01% or more.

Zr: 0.350% or less

Zirconium (Zr) contributes to increasing strength by reduction of the prior γ grain diameter and the refinement of the internal structure of martensite caused by this reduction. Moreover, Zr increases the strength and improves edge cracking resistance by forming fine Zr carbides and carbonitrides that serve as hydrogen trapping sites. However, addition of a large amount of Zr increases coarse Zr-based precipitates and deteriorates the edge cracking resistance. Thus, when Zr is to be contained in the steel sheet, the Zr content is 0.350% or less and preferably 0.10% or less. The effects according to aspects of the present invention can be obtained as long as the Zr content is 0.350% or less, and thus the lower limit of the Zr content is not particularly limited. In order to more effectively obtain the effect of increasing the strength and improving the edge cracking resistance, the Zr content is preferably 0.005% or more.

Ca: 0.0050% or less

Calcium (Ca) immobilizes S by forming CaS, and improves the edge cracking resistance. However, addition of a large amount of Ca deteriorates the surface quality and the bendability; thus, when Ca is to be contained in the steel sheet, the Ca content is 0.0050% or less and preferably 0.0035% or less. The effects according to aspects of the present invention can be obtained as long as the Ca content is 0.0050% or less, and thus the lower limit of the Ca content is not particularly limited. From the viewpoint of more effectively obtaining the effect of improving the edge cracking resistance, the Ca content is preferably 0.0002% or more.

V: 0.500% or less

Vanadium (V) improves the hardenability of the steel and can be added to obtain an effect of generating V-containing fine carbides that serve as hydrogen trapping sites and an effect of improving the edge cracking resistance by refinement of martensite. However, at a V content exceeding 0.500%, the castability is notably deteriorated. Thus, when V is to be contained in the steel sheet, the V content is 0.500% or less and preferably 0.200% or less. The V content is more preferably 0.050% or less. The effects according to aspects of the present invention can be obtained as long as the V content is 0.500% or less, and thus the lower limit of the V content is not particularly limited. From the viewpoint of more effectively obtaining the aforementioned effects achieved by addition of V, The V content is preferably 0.005% or more.

W: 0.200% or less

Tungsten (W) contributes to increasing the strength and improving edge cracking resistance by forming fine W carbides and W carbonitrides that serve as hydrogen trapping sites. However, when a large amount of W is contained, the amount of coarse precipitates that remain undissolved during slab heating in the hot rolling step increases, and the bendability is deteriorated. Thus, when W is to be contained in the steel sheet, the W content is 0.200% or less and preferably 0.050% or less. The W content is more preferably 0.020% or less. The effects according to aspects of the present invention can be obtained as long as the W content is 0.200% or less, and thus the lower limit of the W content is not particularly limited. Furthermore, from the viewpoint of effectively obtaining the effect of increasing the strength and improving the edge cracking resistance, the W content is preferably 0.005% or more.

Cu: 1.00% or less

Copper (Cu) improves corrosion resistance in an environment in which automobiles are used. Furthermore, addition of Cu has an effect in that corrosion products cover the surface of the steel sheet and suppress penetration of hydrogen into the steel sheet. However, when an excessively large amount of Cu is contained, surface defects may occur. Thus, when Cu is to be contained in the steel sheet, the Cu content is 1.00% or less and preferably 0.5% or less. The effects according to aspects of the present invention can be obtained as long as the Cu content is 1.00% or less, and thus the lower limit of the Cu content is not particularly limited. From the viewpoint of more effectively obtaining the effect of improving the corrosion resistance and suppressing hydrogen penetration, the Cu content is preferably 0.01% or more. Furthermore, from the viewpoint of improving the edge cracking resistance, the Cu content is more preferably 0.05% or more.

Ni: 1.00% or less

Nickel (Ni) is also an element that has an effect of improving the corrosion resistance. In addition, Ni has an effect of decreasing the surface defects that are prone to occur when Cu is contained. However, when an excessively large amount of Ni is contained, scale formation in the heating furnace becomes uneven, which causes surface defects, and the cost increases prominently. Thus, when Ni is to be contained in the steel sheet, the Ni content is 1.00% or less and preferably 0.30% or less. The Ni content is more preferably 0.15% or less. The effects according to aspects of the present invention can be obtained as long as the Ni content is 1.00% or less, and thus the lower limit of the Ni content is not particularly limited. From the viewpoint of more effectively obtaining the aforementioned effects achieved by addition of Ni, the Ni content is preferably 0.01% or more.

Sb: 0.100% or less

Antimony (Sb) suppresses oxidation and nitridation of the surface layer and thereby suppresses the decrease in C and B contents. Generation of ferrite in the surface layer is suppressed by suppressing the decrease in C and B contents, and this contributes to increasing the strength and improving the edge cracking resistance. However, at an Sb content exceeding 0.100%, the castability is deteriorated, Sb segregates at the prior $\gamma$ grain boundaries, and the edge cracking resistance is thereby deteriorated. Thus, when Sb is to be contained in the steel sheet, the Sb content is 0.100% or less and preferably 0.050% or less. The Sb content is more preferably 0.020% or less. The effects according to aspects of the present invention can be obtained as long as the Sb content is 0.100% or less, and thus the lower limit of the Sb content is not particularly limited. From the viewpoint of more effectively obtaining the aforementioned effects achieved by addition of Sb, the Sb content is preferably 0.001% or more.

Sn: 0.100% or less

Tin (Sn) suppresses oxidation and nitridation of the surface layer and thereby suppress the decrease in C and B contents in the surface layer. Generation of ferrite in the surface layer is suppressed by suppressing the decrease in C and B contents, and this contributes to increasing the strength and improving the edge cracking resistance. However, at a Sn content exceeding 0.100%, the castability is deteriorated, Sn segregates at the prior $\gamma$ grain boundaries, and the edge cracking resistance is thereby deteriorated. Thus, when Sn is to be contained in the steel sheet, the Sn content is 0.100% or less and preferably 0.050% or less. The Sn content is more preferably 0.020% or less. The effects according to aspects of the present invention can be obtained as long as the Sn content is 0.100% or less, and thus the lower limit of the Sn content is not particularly limited. From the viewpoint of more effectively obtaining the aforementioned effects achieved by addition of Sn, the Sn content is preferably 0.001% or more.

Mg: 0.01% or less

Magnesium (Mg) immobilizes O by forming MgO, and improves the edge cracking resistance. However, addition of a large amount of Mg deteriorates the surface quality and the bendability. Thus, when Mg is to be contained in the steel sheet, the Mg content is 0.01% or less and preferably 0.0020% or less. The Mg content is more preferably 0.0010% or less. The effects according to aspects of the present invention can be obtained as long as the Mg content is 0.01% or less, and thus the lower limit of the Mg content is not particularly limited. In addition, from the viewpoint of more effectively obtaining the effect of improving the edge cracking resistance, the Mg content is preferably 0.0002% or more.

REM: 0.01% or less

A rare earth metal (REM) makes inclusions finer, decreases the starting points for fracture, and thus improves bendability and edge cracking resistance. However, when a large amount of REM is contained, inclusions coarsen, and bendability and edge cracking resistance are deteriorated. Thus, when REM is to be contained in the steel sheet, the REM content is 0.01% or less and preferably 0.0020% or less. The REM content is more preferably 0.0010% or less. The effects according to aspects of the present invention can be obtained as long as the REM content is 0.01% or less, and thus the lower limit of the REM content is not particularly limited. In addition, from the viewpoint of more effectively obtaining the effect of improving the bendability and the edge cracking resistance, the REM content is preferably 0.0002% or more.

Next, the reasons for limiting the steel microstructure of the steel sheet according to aspects of the present invention are described.

In the steel microstructure of the steel sheet according to aspects of the present invention, the area ratio of martensite is 70% or more, the area ratio of bainite is 30% or less, and the total area ratio of ferrite and retained austenite is 5% or less.

Area ratio of martensite: 70% or more

In order to obtain the specified strength, the steel microstructure needs to contain 70% or more of martensite. When the area ratio is below this range, bainite, ferrite, and retained austenite increase, and it becomes difficult to obtain the specified strength. A method for obtaining the specified strength from a microstructure that has a martensite volume fraction of less than 70% is to decrease the tempering temperature. However, when the tempering temperature is excessively low, toughness is degraded, and the edge cracking resistance is deteriorated. Alternatively, increasing the C content can also increase the strength; however, due to the possibility of deteriorating the weldability, increasing the C content is not preferable. Thus, in order to obtain the specified strength in addition to excellent edge cracking resistance and excellent weldability, the area ratio of martensite needs to be 70% or more. The area ratio of martensite is preferably 85% or more. Here, martensite includes tempered martensite, martensite that has undergone self-tempering during continuous cooling, and martensite that has not undergone tempering by holding a temperature of 150° C. or higher and 260° C. or lower for a particular period of time. The area ratio of martensite may be 100%.

Area ratio of bainite: 30% or less

In order to obtain the specified strength, the area ratio of bainite is 30% or less and preferably 15% or less. The area ratio of bainite may be 0%.

Total area ratio of ferrite and retained austenite: 5% or less

The balance of the microstructure other than martensite and bainite is ferrite, retained austenite, etc. Ferrite and retained austenite have yet lower strength than bainite. In order to obtain the strength according to aspects of the present invention, the total of the area ratio of ferrite and retained austenite is 5% or less and preferably 3% or less. The total area ratio of ferrite and retained austenite may be 0%.

Next, the method for measuring the area ratios of the steel microstructures described above is described. An L cross section (a cross section taken in parallel to the rolling direction and perpendicular to the steel sheet surface) of a steel sheet is polished and etched with nital, four view areas are observed with a scanning electron microscope (SEM) at a magnification of 2000× at a ¼ thickness position from the steel sheet surface, and the microstructure images taken are analyzed to measure the area ratios of the steel microstructures. In this measurement, martensite and bainite are observed as gray regions. Meanwhile, ferrite is observed as black regions. Although trace amounts of carbides, nitrides, sulfides, and oxides are contained inside martensite and bainite, these are difficult to exclude and thus the area ratios are measured as the regions that contain these substances.

Retained austenite is measured by chemically polishing a region of the steel sheet that spans from the surface to a 200 μm position in the thickness direction with oxalic acid, and performing X-ray diffraction intensity method on the polished surface. The volume fraction of retained austenite is calculated from the integral intensity of the peaks of the (200)α, (211)α, (220)α, (200)γ, (220)γ, and (311)γ diffraction planes measured by Mo-Kα ray. Then the volume fraction of the retained austenite is assumed to be the area ratio of retained austenite. Martensite and bainite can be distinguished by observing the positions of the carbides contained therein and the crystal orientation relationships with a SEM at a magnification of 10000×. In bainite, carbides are generated at the interfaces of the lath structures or inside the lath and there is only one crystal orientation relationship between bainitic ferrite and cementite; thus, the generated carbides extend in one direction. In contrast, in martensite, carbides are generated inside the laths, and there are two or more crystal orientation relationships between laths and carbides; thus, the generated carbides extend in more than one directions. In addition, in bainite, the aspect ratio of the microstructure is relatively high, and retained austenite considered to be generated by concentration of C can be observed as white regions between laths.

Number density of carbides having long axes of 0.5 μm or more at ¼ thickness position of steel sheet: 60000 carbides/mm$^2$ or less Coarse carbides act as starting points of fracture during bending and degrade the bendability; thus the number density of the carbides having long axes of 0.5 μm or more at a ¼ thickness position of the steel sheet must be limited to 60000 carbides/mm$^2$ or less. The number density of the carbides is preferably 30000 carbides/mm$^2$ or less. Note that carbides having long axes less than 0.5 μm do not adversely affect the bendability and thus are not targeted here. The long axis of a carbide according to aspects in the present invention refers to a value of the longest diameter of the carbide in the L cross section (cross section parallel to the rolling direction and perpendicular to the steel sheet surface) observed in the method described in Examples. Specifically, in the aforementioned method, an L cross section (a cross section taken in parallel to the rolling direction and perpendicular to the steel sheet surface) of a steel sheet is polished and etched with picral, ten view areas are observed with a scanning electron microscope (SEM) at a magnification of 10000× at a ¼ thickness position from the steel sheet surface, and the number density of carbides having long axes of 0.5 μm or more is measured.

Number density (hereinafter may be simply referred to as the number density Nc) of inclusion grains having equivalent circle diameters of 4.0 µm or more in a ¼-to-¾ thickness region of the steel sheet: 10 grains/mm² or more and 30 grains/mm² or less Edge cracks highly frequently occur in the ¼-to-¾ thickness region of the steel sheet. The present inventors have found that edge cracking can be suppressed by adjusting the number density Nc of inclusion grains having equivalent circle diameters of 4.0 µm or more in this region to 10 grains/mm² or more and 30 grains/mm² or less. This is presumably because during shearing, microcracks occur from the inclusions as starting points, and become connected to each other along the surface parallel to the sheet thickness direction, and thus a fracture surface with fewer edge cracks is formed. In contrast, when there are fewer inclusions present near the center in the sheet thickness direction, the intervals between the inclusions are large, the aforementioned effect is not achieved, and cracks tend to propagate in various directions. Thus, when there are fewer inclusions near the center in the sheet thickness direction, cracks tend to propagate toward the interior (a direction intersecting the surface parallel to the sheet thickness direction) of the fracture surface of the steel sheet, and edge cracks are more likely to occur. Here, the correlation between the number density of inclusions and the likelihood of the edge cracking is investigated, and a clear correlation was found by targeting inclusions having equivalent circle diameters of 4.0 µm or more. Thus, it is considered that inclusions having equivalent circle diameters of less than 4.0 µm have little effect of generating microcracks starting from such inclusions and inducing these microcracks to connect with one another. Thus inclusions having equivalent circle diameters of less than 4.0 µm are not targeted in aspects of the present invention. Meanwhile, inclusions having equivalent circle diameters exceeding 15 µm are rarely present, and thus, virtually, inclusions having equivalent circle diameters of 15 µm or less are targeted. In order to sufficiently obtain the aforementioned effects, the number density Nc is 10 inclusions/mm² or more and preferably 15 inclusions/mm² or more. From the viewpoint of suppressing edge cracking, the number density Nc is preferably large; however, at an Nc exceeding a particular value, the bendability is deteriorated. From the viewpoint of suppressing deterioration of bendability, the number density Nc is 30 inclusions/mm² or less and preferably 25 inclusions/mm² or less.

Moreover, the number density (grains/mm²) of inclusion grains referred in accordance with aspects of the present invention means the number of inclusion grains having equivalent circle diameters of 4.0 µm or more per square millimeter in an L cross section (cross section parallel to the rolling direction and perpendicular to the steel sheet surface) of a steel sheet observed by the method described in Examples.

Number density of inclusion grains having equivalent circle diameters of 4.0 µm or more in a surface-to-¼ thickness region of the steel sheet: 27 grains/mm² or less Bendability deteriorates prominently when the number density Ns of inclusion grains having equivalent circle diameters of 4.0 µm present in the surface-to-¼ thickness region of the steel sheet exceeds 27 grains/mm². In order to stably obtain excellent bendability, the number density Ns is 27 grains/mm² or less and preferably 20 grains/mm² or less.

Specifically, the method for measuring the number density of the inclusions includes, first, polishing an L cross section (a cross section taken in parallel to the rolling direction and perpendicular to the steel sheet surface) of a steel sheet, and, without etching, taking images of twenty view areas with an optical microscope at a magnification of 100×. The obtained images are analyzed to obtain the average number density of inclusion grains having equivalent circle diameters of 4.0 µm or more for the ¼-to-¾ thickness region of the steel sheet and for the surface-to-¼ thickness region of the steel sheet.

Tensile strength (TS): 1310 MPa or higher

The tensile strength of the steel sheet is 1310 MPa or higher. Note that high strength referred to in accordance with aspects of the present invention refers to a tensile strength of 1310 MPa or higher. Deterioration of the edge cracking resistance becomes notable when the tensile strength of the raw material is 1310 MPa or higher. One of the features of the steel sheet according to aspects of the present invention is that the edge cracking resistance is excellent even when the tensile strength is 1310 MPa or higher.

The tensile strength is measured by a tensile test. Specifically, in a tensile test, a JIS No. 5 tensile test specimen is cut out in such a manner that a direction orthogonal to the rolling direction is the longitudinal direction, and is subjected to a tensile test in accordance with JIS Z 2241 (2011) to evaluate the tensile strength. The crosshead speed of the tensile test is 10 mm/min.

The steel sheet according to aspects of the present invention has excellent edge cracking resistance. Having excellent edge cracking resistance means that, when the edge cracking resistance of the steel sheet is evaluated by the method described in Examples, the ratio of the observation test specimens in which the edge cracks occurred in the steel sheet is less than 50%.

Figure 2:
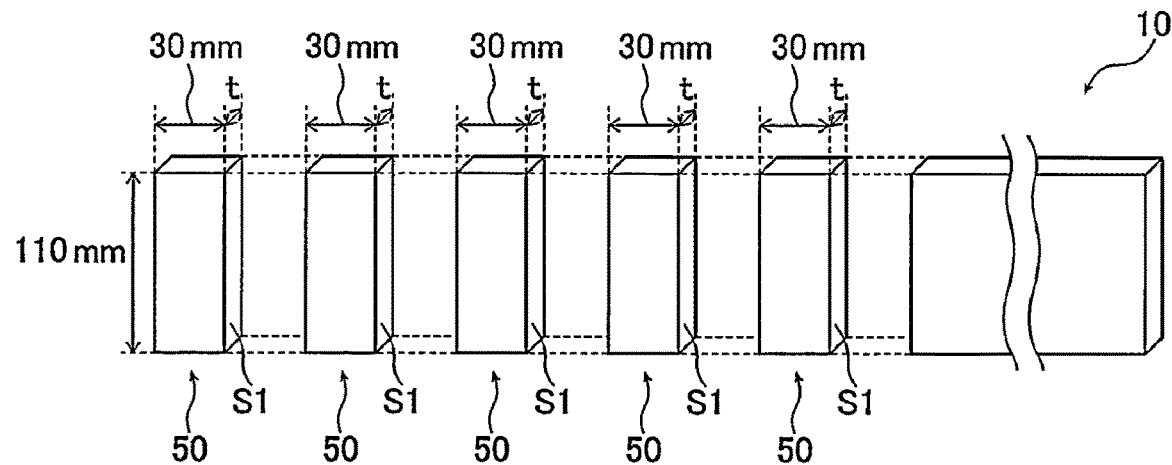
FIG. 2 is a diagram illustrating five strip-shaped test specimens prepared by shearing a test specimen at 30 mm intervals.
Figure 3:
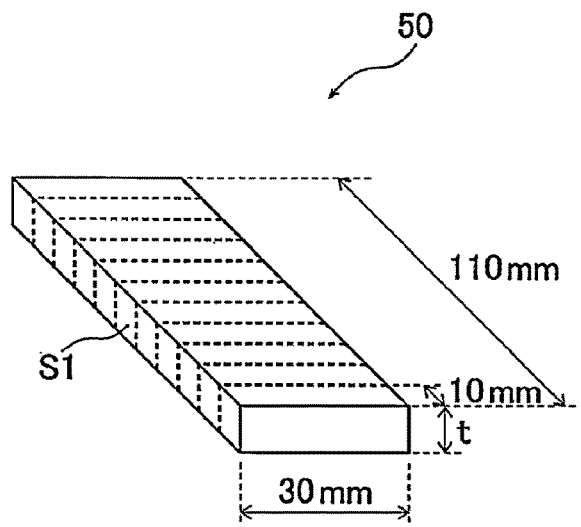
FIG. 3 is a perspective view of a strip-shaped test specimen.
Figure 4:
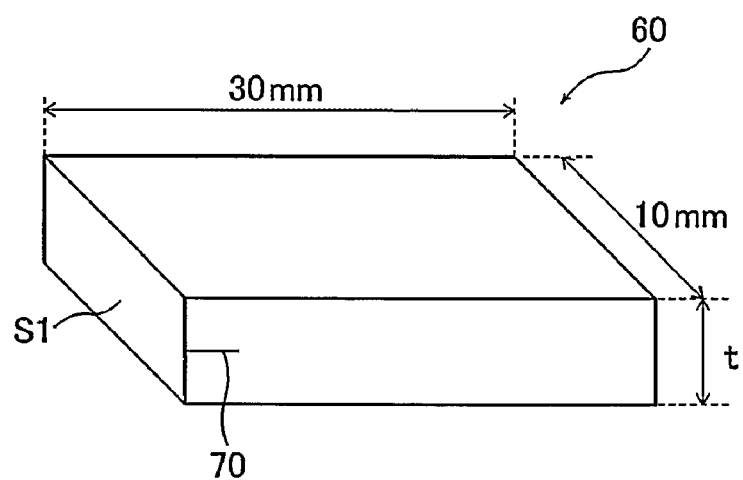
FIG. 4 is a perspective view of an observation test specimen with an edge crack.

In a method for evaluating the edge cracking resistance, first, a test specimen 10 110 mm long in the rolling direction and 500 mm long in the direction orthogonal to the rolling direction is cut out from a center portion of a steel sheet in a direction (transverse direction) orthogonal to the rolling direction. By using a cutting machine 100 illustrated in FIG. 1, the test specimen 10 held between a lower blade 30 and a sheet holder 40 is sheared by bringing an upper blade 20 down. The shearing conditions are that the clearance CL is 15% of the sheet thickness t and the shear angle (the slope with respect to the sheet surface of the steel sheet) is 0°. Under such shearing conditions, the test specimen 10 is sheared five times at 30 mm intervals in the direction orthogonal to the rolling direction so as to obtain five strip-shaped test specimens 50 illustrated in FIG. 2. Each of the strip-shaped test specimens 50 has a sheared surface S1 which has been facing the upper blade 20 during shearing. Each of the five strip-shaped test specimens 50 is cut at 10 mm intervals in the rolling direction. As a result of this cutting, one strip-shaped test specimen 50 is divided into 11 pieces. The cutting positions of the strip-shaped test specimen 50 are indicated by broken lines in FIG. 3. Of the eleven pieces obtained by cutting a strip-shaped test specimen 50, ten pieces are used as observation test specimens 60. Thus, from five strip-shaped test specimens 50, a total of 50 observation test specimens 60 are taken and used in observation of edge cracks. Each of the observation test specimens 60 is polished at the sheared surface S1, and, without etching, the presence/absence of the edge cracks is observed with an optical microscope. As illustrated in FIG. 4, for each of the observation test specimens 60, the sheared surface S1 is observed from the thickness surface side in the same direction. In accordance with aspects of the present invention, any observation test specimen 60 that has one or more cracks 70 extending 30 µm or more from the sheared surface S1 in the depth direction is determined as having edge cracks. In accordance with aspects of the present invention, a steel sheet in which the ratio of the observation test specimens 60 having edge cracks is less than 50% is evaluated as having excellent edge cracking resistance.

The steel sheet according to aspects of the present invention has excellent bendability. Having excellent bendability referred in accordance with aspects of the present invention means that when bendability is evaluated by a 90° V bend test according to the method described in Examples, the value (R/t) obtained by dividing the minimum bending radius R that does not generate cracks in the test specimen surface by the sheet thickness t is 4.0 or less.

Here, specifically, the method for evaluating bendability involves, first, taking a JIS No. 3 test specimen from each steel sheet such that the longitudinal direction is the direction (coil width direction) orthogonal to the rolling direction, and subjecting the test specimen to a 90° V bend test by a V block method in accordance with JIS Z 2248 while varying the bending radius. Then the bendability is evaluated by the value (R/t) obtained by dividing the minimum bending radius R that does not generate cracks in the test specimen surface by the sheet thickness t. Here, the bend ridge direction is parallel to the rolling direction.

A preferable sheet thickness of the steel sheet according to aspects of the present invention is within the range of 0.8 to 2.6 mm.

The steel sheet according to aspects of the present invention may have a coating layer on the surface. The type of the coating layer is not particularly limited, and may be a Zn plating layer or a non-Zn metal plating layer.

The coating layer may contain components other than the main component, such as Zn.

Next, one embodiment of the method for producing the steel sheet according to aspects of the present invention is described. It should be noted that the temperatures of heating or cooling the steel sheet or the like described below are surface temperatures of a slab (steel material), a steel sheet, or the like unless otherwise noted.

A method for producing a steel sheet according to aspects of the present invention includes a slab heating step that involves heating the slab having the aforementioned chemical composition under such conditions that an average heating rate in a slab surface temperature range from 300° C. to 1220° C. is 0.10° C./s or more and that an average temperature ratio (Tc/Ts) of a slab center temperature Tc to a slab surface temperature Ts in this temperature range is 0.85 or less, and then holding the resulting slab under such conditions that a slab surface temperature of 1220° C. or higher is held for 30 minutes or longer and a slab center temperature of 1220° C. or higher is held for 30 minutes or shorter; a hot rolling step of hot-rolling the slab that has been subjected to the slab heating step so as to produce a hot rolled steel sheet; a cold rolling step of cold-rolling the hot rolled steel sheet into a cold rolled steel sheet; and an annealing step of holding the cold rolled steel sheet at an annealing temperature of 800° C. or higher for 240 seconds or longer, then cooling the annealed steel sheet at an average cooling rate of 70° C./s or more in a temperature range from a cooling start temperature of 680° C. or higher to 300° C., and then holding the resulting steel sheet in a temperature range of 150° C. or higher and 260° C. or lower for 20 seconds or longer and 1500 seconds or shorter.

First, the conditions of the slab heating step are described.

Heating under such conditions that the average heating rate in a slab surface temperature range from 300° C. to 1220° C. is 0.10° C./s or more and that the average temperature ratio (Tc/Ts) of the slab center temperature Tc to the slab surface temperature Ts in this temperature range is 0.85 or less After a continuously cast slab is cooled to a surface temperature of 300° C. or lower, the slab is heated under such conditions that the average heating rate in a slab surface temperature range from 300° C. to 1220° C. is 0.10° C./s or more and that the average temperature ratio (Tc/Ts) of the slab center temperature Tc to the slab surface temperature Ts in this temperature range is 0.85 or less. As a result, a temperature gradient is generated between the slab surface temperature and the slab center temperature, and the number density Ns and the number density Nc can be controlled to be within the specified range. The upper limit of the average heating rate is not particularly limited. However, at an average heating rate exceeding 0.50° C./s, the effect would saturate; thus, the average heating rate is preferably 0.50° C./s or less. Furthermore, from the viewpoint of making the crystal grain size uniform in the steel sheet and inhibiting sheet thickness deviation during hot rolling and cold rolling, the average heating rate is more preferably 0.20° C./s or less.

In order to further increase the temperature gradient, the average temperature ratio (Tc/Ts) of the slab center temperature Tc to the slab surface temperature Ts is preferably small. In accordance with aspects of the present invention, the average temperature ratio (Tc/Ts) is 0.85 or less and preferably 0.80 or less. These heating conditions can be achieved by, for example, increasing the thickness of the slab and/or increasing the heating rate of the slab.

The aforementioned average temperature ratio (Tc/Ts) described in accordance with aspects of the present invention is obtained by determining the temperature ratio of the slab center temperature Tc to the slab surface temperature Ts for each of temperatures of 300° C., 600° C., 900° C., and 1200° C. and then averaging the temperature ratios at these four temperatures. The slab surface temperature can be actually measured by a radiation thermometer. The slab center temperature can be determined by heat transfer calculation.

In the slab heating step, the average heating rate is obtained by "(1220 (° C.)−300 (° C.))/(heating time (sec) from 300° C. to 1220° C.)".

Holding the slab under such conditions that a slab surface temperature of 1220° C. or higher is held for 30 minutes or longer and a slab center temperature of 1220° C. or higher is held for 30 minutes or shorter In order to control the number density Ns to 27 grains/mm$^2$ or less, the slab surface temperature must be held at 1220° C. or higher for 30 minutes or longer to promote dissolution of coarse Nb and Ti inclusions. In addition, if the slab center temperature can be held at 1220° C. or higher for 30 minutes or shorter, the specified number density Nc according to aspects of the present invention can be satisfied.

Regarding the feature that the length of time of holding 1220° C. or higher at the slab surface is to be longer than the length of time of holding 1220° C. or lower at the slab center portion, this feature can be achieved by heating the slab surface. This is because by heating the slab surface, the temperature of the slab surface increases first, and then the heat is transmitted toward the center portion of the slab, and thus the temperature of the center portion increases with delay. In addition, holding the slab surface temperature at 1220° C. for 30 minutes or longer and holding the slab center temperature at 1220° C. or higher for 30 minutes or shorter can be achieved by, specifically, for example, increasing the thickness of the slab and/or increasing the heating rate of the slab. The upper limit of the slab surface temperature is not particularly limited, but an excessively high temperature is not economically preferable; thus, the upper limit is preferably 1300° C. or lower.

Next, the hot rolling step is described.

The hot rolling step involves hot-rolling the slab which has been subjected to the slab heating step so as to produce a hot rolled steel sheet. Hot rolling can be performed by a common method, and the conditions are not particularly limited. The conditions for the finish rolling end temperature and the coiling temperature are not particularly limited, but the finish rolling end temperature is preferably in the temperature range of 840 to 950° C. and the coiling temperature is preferably in the temperature range of 400 to 700° C.

Next, the cold rolling step is described.

The cold rolling step involves cold-rolling the hot rolled steel sheet into a cold rolled steel sheet. Cold rolling can be performed by a common method, and the conditions are not particularly limited.

Next, the annealing step is described.

Holding the cold rolled steel sheet at an annealing temperature of 800° C. or higher for 240 seconds or longer In accordance with aspects of the present invention, in order to obtain specified martensite, the cold rolled steel sheet must be held at an annealing temperature of 800° C. or higher for 240 seconds or longer. If the temperature is lower than this or the holding time is shorter than this, austenite is not sufficiently generated. Thus, the final product does not contain the specified martensite, and does not exhibit a tensile strength of 1310 MPa or higher. The upper limits of the annealing temperature and the holding time are not particularly limited; however, when the annealing temperature is high or the holding time is long, the austenite grain diameters increase, and possibly the toughness is deteriorated. Thus, the annealing temperature is preferably 950° C. or lower. In addition, the holding time is preferably 900 seconds or shorter.

Cooling at an average cooling rate of 70° C./s or more in the temperature range from a cooling start temperature of 680° C. or higher to 300° C.

In order to decrease ferrite and retained austenite and adjust the area ratio of martensite to 70% or more, the temperature range from a cooling start temperature of 680° C. or higher to 300° C. needs to be cooled at an average cooling rate of 70° C./s or more. Although the upper limit of the average cooling rate is not particularly limited, from the viewpoint of reducing the load of facility investment, the upper limit is preferably 2000° C./s or lower. At a cooling start temperature lower than this, a large amount of ferrite is generated. When the cooling rate is slow or the cooling stop temperature exceeds 300° C., upper bainite and lower bainite are generated. The cooling rate from the annealing temperature to the cooling start temperature is not particularly limited.

Here, the average cooling rate is obtained by "(cooling start temperature (° C.)−300 (° C.))/(cooling time (sec) from cooling start temperature to 300° C.)".

Holding the temperature in the temperature range of 150° C. or higher to 260° C. or lower for 20 seconds or longer and 1500 seconds or shorter The toughness of martensite is known to improve by tempering, and, in order to obtain excellent edge cracking resistance, the temperature needs to be held in the range of 150° C. or higher and 260° C. or lower for 20 seconds or longer and 1500 seconds or shorter. The cooling stop temperature after quenching may be set in the temperature range of 150° C. or higher and 260° C. or lower, or re-heating may be performed after cooling to lower than 150° C. so as to obtain a temperature in the range of 150° C. or higher and 260° C. or lower. When holding is performed at a temperature lower than 150° C. or for a time period shorter than 20 seconds, the material homogenization effect achieved by tempering may become insufficient, and thus the edge cracking resistance is deteriorated. At a holding temperature higher than 260° C., a large amount of coarse carbides are generated, and the bendability is deteriorated. When the holding time is longer than 1500 seconds, the effect of tempering saturates, and production cost increases.

The method for producing a steel sheet according to aspects of the present invention may have a coating step of coating a steel sheet after the annealing step. A steel sheet having a coating layer on the surface can be obtained by performing coating. In the method for producing a steel sheet according to aspects of the present invention, the surface of the steel sheet is preferably electrogalvanized as the coating process.

From the viewpoint of stabilizing the press formability such as adjusting the surface roughness and planarizing the sheet shape, the steel sheet may be temper-rolled. When the aforementioned coating process and temper rolling are to be performed, temper rolling is performed after the coating process.

In a series of heat treatments in the production method according to aspects of the present invention, the holding temperature need not be constant as long as the temperature is within the aforementioned temperature range, and even when the cooling rate fluctuates during cooling, the gist of aspects of the present invention is not impaired as long as the cooling rate is within the specified range. Moreover, the steel sheet may be heat-treated in any facility as long as the heat history is satisfied.

A member and a production method therefor according to aspects of the present invention will now be described.

A member according to aspects of the present invention is obtained by subjecting the steel sheet according to aspects of the present invention to at least one selected from forming and welding. A method for producing the member according to aspects of the present invention includes a step of subjecting a steel sheet produced by the method for producing a steel sheet according to aspects of the present invention to at least one selected from forming and welding.

The steel sheet according to aspects of the present invention has a tensile strength of 1310 MPa or higher and excellent edge cracking resistance and bendability. Thus, a member obtained by using the steel sheet according to aspects of the present invention also has high strength, and compared to existing high-strength members, notably fewer cracks occur during forming or upon automobile body crushing. Moreover, the weight can be reduced by using the member according to aspects of the present invention. Thus, the member according to aspects of the present invention is suitable for the use in, for example, car body frame parts.

Forming may be any typical working method such as pressing. Moreover, welding may be any common welding such as spot welding and arc welding.

EXAMPLES

Example 1

Although the present invention will now be specifically described by referring to Examples, these examples do not limit the present invention.

A steel having a chemical composition shown in Table 1 was obtained by steel making and cast into a slab, and the slab was heated under the slab heating conditions shown in Table 2 and then hot-rolled. In hot rolling, the finish rolling end temperature was in the range of 840 to 950° C. and the coiling temperature was within the range of 400 to 700° C. The obtained hot rolled steel sheet was pickled and cold-rolled to obtain a cold rolled steel sheet. The obtained cold rolled steel sheet was heat-treated under the continuous annealing conditions shown in Table 2, and then temper-rolled at 0.1% to obtain a steel sheet. The thickness of the steel sheet was 1.4 mm for all samples. A cold rolled steel sheet (CR) No. 18 was electrogalvanized into a electrogalvanized steel sheet (EG). In Table 2, the slab surface temperature was actually measured by a radiation thermometer, and the slab center temperature was determined from the heat transfer calculation.

TABLE 1

| Steel No. | C | Si | Mn | P | S | sol. Al | N | B | Nb | Ti | [% Ti] + [% Nb] | others | Remarks |
|---|---|---|---|---|---|---|---|---|---|---|---|---|---|
| A | 0.13 | 0.05 | 1.3 | 0.028 | 0.0017 | 0.04 | 0.0042 | 0.0015 | 0.014 | 0.018 | 0.032 | — | Compliant steel |
| B | 0.38 | 0.72 | 0.6 | 0.017 | 0.0025 | 0.04 | 0.0050 | 0.0027 | 0.018 | 0.026 | 0.044 | — | Compliant steel |
| C | 0.23 | 1.43 | 0.6 | 0.041 | 0.0018 | 0.04 | 0.0038 | 0.0021 | 0.018 | 0.027 | 0.045 | — | Compliant steel |
| D | 0.28 | 0.52 | 1.7 | 0.028 | 0.0006 | 0.03 | 0.0027 | 0.0020 | 0.019 | 0.026 | 0.045 | — | Compliant steel |
| E | 0.31 | 0.38 | 1.4 | 0.045 | 0.0013 | 0.05 | 0.0035 | 0.0022 | 0.025 | 0.039 | 0.064 | — | Compliant steel |
| F | 0.33 | 1.04 | 1.6 | 0.020 | 0.0040 | 0.06 | 0.0035 | 0.0009 | 0.017 | 0.026 | 0.043 | — | Compliant steel |
| G | 0.36 | 0.22 | 1.6 | 0.009 | 0.0024 | 0.82 | 0.0038 | 0.0019 | 0.010 | 0.038 | 0.048 | — | Compliant steel |
| H | 0.15 | 0.27 | 1.6 | 0.009 | 0.0017 | 0.03 | 0.0069 | 0.0025 | 0.010 | 0.024 | 0.034 | — | Compliant steel |
| I | 0.23 | 0.46 | 1.2 | 0.028 | 0.0011 | 0.05 | 0.0038 | 0.0045 | 0.021 | 0.017 | 0.038 | — | Compliant steel |
| J | 0.18 | 0.30 | 0.9 | 0.021 | 0.0020 | 0.03 | 0.0029 | 0.0029 | 0.013 | — | 0.013 | — | Compliant steel |
| K | 0.28 | 1.19 | 0.8 | 0.007 | 0.0006 | 0.04 | 0.0036 | 0.0015 | 0.076 | — | 0.076 | — | Compliant steel |
| L | 0.15 | 0.41 | 1.3 | 0.032 | 0.0025 | 0.03 | 0.0049 | 0.0019 | — | 0.012 | 0.012 | — | Compliant steel |
| M | 0.37 | 0.54 | 1.4 | 0.030 | 0.0021 | 0.03 | 0.0032 | 0.0018 | — | 0.068 | 0.068 | — | Compliant steel |
| N | 0.18 | 0.53 | 1.5 | 0.009 | 0.0014 | 0.03 | 0.0035 | 0.0009 | 0.005 | 0.008 | 0.013 | — | Compliant steel |
| O | 0.29 | 0.62 | 1.3 | 0.031 | 0.0006 | 0.05 | 0.0025 | 0.0022 | 0.019 | 0.052 | 0.071 | Mo: 0.050, Cr: 0.050, Zr: 0.010 | Compliant steel |
| P | 0.30 | 1.11 | 1.0 | 0.025 | 0.0013 | 0.03 | 0.0040 | 0.0018 | 0.014 | 0.024 | 0.038 | Ca: 0.0025, V: 0.012, W: 0.008 | Compliant steel |
| Q | 0.19 | 0.29 | 1.3 | 0.043 | 0.0005 | 0.04 | 0.0035 | 0.0014 | 0.013 | 0.030 | 0.043 | Cu: 0.13, Ni: 0.05, Mg: 0.0005 | Compliant steel |
| R | 0.27 | 1.39 | 0.9 | 0.018 | 0.0010 | 0.06 | 0.0043 | 0.0025 | 0.020 | 0.007 | 0.027 | Sb: 0.008, Sn: 0.005, REM: 0.0004 | Compliant steel |
| S | 0.11 | 1.16 | 1.4 | 0.006 | 0.0019 | 0.04 | 0.0043 | 0.0012 | 0.019 | 0.034 | 0.053 | — | Comparative steel |
| T | 0.44 | 0.82 | 1.5 | 0.028 | 0.0006 | 0.02 | 0.0039 | 0.0021 | 0.008 | 0.038 | 0.046 | — | Comparative steel |
| U | 0.25 | 1.58 | 1.6 | 0.042 | 0.0007 | 0.03 | 0.0049 | 0.0029 | 0.014 | 0.020 | 0.034 | — | Comparative steel |
| V | 0.35 | 0.32 | 1.4 | 0.063 | 0.0012 | 0.05 | 0.0040 | 0.0016 | 0.002 | 0.031 | 0.033 | — | Comparative steel |
| W | 0.32 | 0.21 | 1.4 | 0.028 | 0.0110 | 0.03 | 0.0036 | 0.0017 | 0.032 | 0.011 | 0.043 | — | Comparative steel |
| X | 0.34 | 1.42 | 1.4 | 0.021 | 0.0018 | 1.02 | 0.0031 | 0.0027 | 0.014 | 0.020 | 0.034 | — | Comparative steel |
| Y | 0.28 | 1.20 | 1.1 | 0.006 | 0.0014 | 0.04 | 0.0113 | 0.0019 | 0.008 | 0.037 | 0.045 | — | Comparative steel |
| Z | 0.21 | 1.21 | 1.6 | 0.030 | 0.0021 | 0.04 | 0.0039 | 0.0020 | — | 0.008 | 0.008 | — | Comparative steel |
| AA | 0.24 | 1.10 | 1.4 | 0.012 | 0.0003 | 0.04 | 0.0030 | 0.0009 | 0.007 | — | 0.007 | — | Comparative steel |
| AB | 0.33 | 0.91 | 1.6 | 0.009 | 0.0011 | 0.05 | 0.0037 | 0.0016 | 0.024 | 0.058 | 0.082 | — | Comparative steel |
| AC | 0.26 | 1.01 | 0.8 | 0.021 | 0.0014 | 0.06 | 0.0045 | 0.0020 | — | 0.084 | 0.084 | — | Comparative steel |
| AD | 0.28 | 0.64 | 1.0 | 0.011 | 0.0014 | 0.03 | 0.0040 | 0.0023 | 0.083 | — | 0.083 | — | Comparative steel |
| AE | 0.23 | 0.33 | 0.2 | 0.018 | 0.0010 | 0.03 | 0.0040 | 0.0016 | — | 0.028 | 0.028 | — | Compliant steel |
| AF | 0.22 | 0.38 | 0.1 | 0.029 | 0.0020 | 0.04 | 0.0040 | 0.0019 | 0.005 | 0.022 | 0.027 | — | Comparative steel |

*[% Ti] + [% Nb]: Total content of one or both of Nb and Ti.
The balance other than the aforementioned components is Fe and incidental impurities.

TABLE 2

| | | Slab heating conditions | | | | Annealing conditions | | | | | | |
|---|---|---|---|---|---|---|---|---|---|---|---|---|
| No. | Steel No. | *1 (° C./s) | *2 | *3 (min) | *4 (min) | Annealing temperature (° C.) | *5 (sec) | *6 (° C.) | *7 (° C./s) | *8 (° C.) | *9 (sec) | Remarks |
| 1 | A | 0.14 | 0.76 | 52 | 14 | 870 | 300 | 770 | 700 | 153 | 420 | Example |
| 2 | B | 0.14 | 0.74 | 41 | 12 | 880 | 480 | 755 | 800 | 180 | 540 | Example |
| 3 | C | 0.17 | 0.74 | 54 | 12 | 930 | 420 | 741 | 600 | 170 | 540 | Example |
| 4 | D | 0.16 | 0.75 | 38 | 8 | 850 | 250 | 690 | 100 | 196 | 840 | Example |
| 5 | E | 0.18 | 0.75 | 62 | 21 | 870 | 540 | 774 | 200 | 183 | 720 | Example |
| 6 | F | 0.13 | 0.79 | 48 | 16 | 900 | 420 | 732 | 500 | 185 | 1200 | Example |
| 7 | G | 0.15 | 0.74 | 50 | 8 | 940 | 540 | 689 | 800 | 192 | 1440 | Example |
| 8 | H | 0.15 | 0.73 | 56 | 11 | 870 | 420 | 711 | 70 | 213 | 660 | Example |
| 9 | I | 0.20 | 0.70 | 56 | 6 | 900 | 420 | 756 | 400 | 179 | 600 | Example |
| 10 | J | 0.14 | 0.74 | 56 | 13 | 880 | 360 | 755 | 900 | 198 | 60 | Example |
| 11 | K | 0.19 | 0.75 | 53 | 12 | 860 | 360 | 700 | 1200 | 155 | 480 | Example |
| 12 | L | 0.17 | 0.70 | 62 | 12 | 890 | 600 | 767 | 900 | 180 | 60 | Example |
| 13 | M | 0.16 | 0.76 | 51 | 12 | 880 | 420 | 735 | 1200 | 245 | 480 | Example |
| 14 | N | 0.15 | 0.57 | 48 | 16 | 870 | 540 | 750 | 800 | 151 | 480 | Example |
| 15 | O | 0.16 | 0.72 | 51 | 5 | 860 | 600 | 708 | 80 | 173 | 660 | Example |
| 16 | P | 0.11 | 0.74 | 52 | 10 | 890 | 360 | 774 | 1100 | 175 | 600 | Example |
| 17 | Q | 0.18 | 0.83 | 42 | 17 | 870 | 540 | 750 | 900 | 208 | 600 | Example |
| 18 | R | 0.18 | 0.85 | 32 | 12 | 890 | 540 | 773 | 900 | 193 | 600 | Example |
| 19 | S | 0.15 | 0.79 | 41 | 9 | 940 | 300 | 778 | 800 | 198 | 360 | Comparative Example |
| 20 | T | 0.17 | 0.73 | 57 | 12 | 830 | 420 | 715 | 700 | 181 | 2400 | Comparative Example |
| 21 | U | 0.16 | 0.77 | 48 | 12 | 900 | 420 | 700 | 1100 | 194 | 1440 | Comparative Example |
| 22 | V | 0.18 | 0.73 | 47 | 15 | 860 | 420 | 763 | 600 | 207 | 540 | Comparative Example |
| 23 | W | 0.14 | 0.81 | 37 | 16 | 860 | 480 | 743 | 1100 | 202 | 540 | Comparative Example |
| 24 | X | 0.15 | 0.79 | 53 | 21 | 940 | 360 | 766 | 1200 | 182 | 480 | Comparative Example |
| 25 | Y | 0.15 | 0.80 | 47 | 17 | 880 | 540 | 748 | 1100 | 176 | 660 | Comparative Example |
| 26 | Z | 0.18 | 0.81 | 56 | 27 | 880 | 300 | 777 | 400 | 167 | 420 | Comparative Example |
| 27 | AA | 0.17 | 0.81 | 36 | 15 | 860 | 420 | 731 | 800 | 182 | 420 | Comparative Example |
| 28 | AB | 0.16 | 0.84 | 30 | 12 | 860 | 360 | 708 | 800 | 176 | 540 | Comparative Example |
| 29 | AC | 0.18 | 0.79 | 34 | 10 | 910 | 360 | 728 | 1100 | 201 | 660 | Comparative Example |
| 30 | AD | 0.14 | 0.73 | 32 | 22 | 850 | 360 | 746 | 1000 | 205 | 720 | Comparative Example |
| 31 | A | 0.09 | 0.92 | 56 | 8 | 910 | 420 | 696 | 500 | 152 | 240 | Comparative Example |
| 32 | A | 0.22 | 0.75 | 47 | 18 | 890 | 360 | 774 | 700 | 160 | 600 | Example |
| 33 | K | 0.14 | 0.94 | 26 | 16 | 860 | 360 | 701 | 600 | 160 | 540 | Comparative Example |
| 34 | C | 0.16 | 0.89 | 60 | 32 | 870 | 360 | 768 | 1100 | 194 | 600 | Comparative Example |
| 35 | C | 0.17 | 0.71 | 55 | 7 | 780 | 540 | 701 | 900 | 234 | 720 | Comparative Example |
| 36 | C | 0.20 | 0.84 | 40 | 18 | 880 | 200 | 775 | 600 | 173 | 540 | Comparative Example |
| 37 | I | 0.13 | 0.79 | 47 | 14 | 900 | 480 | 664 | 1000 | 209 | 720 | Comparative Example |
| 38 | O | 0.13 | 0.72 | 53 | 7 | 920 | 240 | 775 | 60 | 187 | 780 | Comparative Example |
| 39 | P | 0.13 | 0.84 | 39 | 16 | 870 | 300 | 740 | 800 | 270 | 480 | Comparative Example |
| 42 | AE | 0.16 | 0.75 | 55 | 14 | 920 | 420 | 860 | 1300 | 188 | 840 | Example |
| 43 | AF | 0.15 | 0.84 | 32 | 10 | 870 | 540 | 690 | 1000 | 192 | 600 | Comparative Example |
| 44 | O | 0.20 | 0.95 | 31 | 10 | 880 | 360 | 771 | 800 | 232 | 840 | Comparative Example |
| 45 | O | 0.15 | 0.90 | 33 | 12 | 870 | 480 | 742 | 1400 | 194 | 720 | Comparative Example |

*1: Average heating rate in a temperature range from 300° C. to 1220° C.
*2: Average temperature ratio (Tc/Ts) of the slab center temperature Tc to the slab surface temperature Ts in the temperature range indicated in *1.
*3: Holding time at a slab surface temperature of 1220° C. or higher.
*4: Holding time at a slab center temperature of 1220° C. or higher.
*5: Holding time at an annealing temperature.
*6: Cooling start temperature.
*7: Average cooling rate from cooling start temperature to 300° C.
*8: Holding temperature after cooling.
*9: Holding time at the holding temperature after cooling.

The following measurements and evaluations were performed on the obtained steel sheets.

(Measuring Area Ratio of Each Microstructure in Steel Microstructure)

An L cross section (a cross section taken in parallel to the rolling direction and perpendicular to the steel sheet surface) of a steel sheet was polished and etched with nital, four view areas were observed with a scanning electron microscope (SEM) at a magnification of 2000× at a ¼ thickness position from the steel sheet surface, and the microstructure images taken were analyzed to measure the area ratios of the respective steel microstructures. In this measurement, martensite and bainite are observed as gray regions. Meanwhile, ferrite is observed as black regions. Although trace amounts of carbides, nitrides, sulfides, and oxides are contained inside martensite and bainite, these are difficult to exclude and thus the area ratios were measured as the regions that contain these substances.

Retained austenite was measured by chemically polishing the portion that extended from the surface of the steel sheet to a 200 μm position in the thickness direction, and performing an X-ray diffraction intensity method on the polished surface. The volume fraction of retained austenite was calculated from the integral intensity of the peaks of the (200)α, (211)α, (220)α, (200)γ, (220)γ, and (311)γ diffraction planes measured by Mo-Kα ray. Then the volume fraction of the retained austenite was assumed to be the area ratio of retained austenite.

Martensite and bainite can be distinguished by observing the positions of the carbides contained therein and the crystal orientation relationships with a SEM at a magnification of 10000×. In bainite, carbides are generated at the interfaces of the lath structures or inside the lath and there is only one crystal orientation relationship between bainitic ferrite and cementite; thus, the generated carbides extend in one direction. In contrast, in martensite, carbides are generated inside the laths, and there are two or more crystal orientation relationships between laths and carbides; thus, the generated carbides extend in more than one directions. In addition, in bainite, the aspect ratio of the microstructure is relatively high, and retained austenite considered to be generated by concentration of C can be observed as white regions between laths.

(Measurement of Number Density of Carbides)

An L cross section (a cross section taken in parallel to the rolling direction and perpendicular to the steel sheet surface) of a steel sheet was polished and etched with picral, ten view areas were observed with a scanning electron microscope (SEM) at a magnification of 10000× at a ¼ thickness position from the steel sheet surface, and the number density of carbides having long axes of 0.5 μm or more was measured.

(Measurement of Number Density of Inclusions)

An L cross section (a cross section taken in parallel to the rolling direction and perpendicular to the steel sheet surface) of a steel sheet was polished, and, without etching, images of twenty view areas were taken with an optical microscope at a magnification of 100×. The obtained images were analyzed to obtain the average number density of inclusion grains having equivalent circle diameters of 4.0 μm or more in the ¼-to-¾ thickness region of the steel sheet and in the surface-to-¼ thickness region of the steel sheet.

(Measuring Tensile Strength)

In a tensile test, a JIS No. 5 tensile test specimen was cut out in such a manner that a direction orthogonal to the rolling direction was the longitudinal direction, and was subjected to a tensile test in accordance with JIS Z 2241 (2011) to evaluate the tensile strength. The crosshead speed of the tensile test was 10 mm/min.

(Evaluation of Edge Cracking Resistance)

A test specimen 10 110 mm long in the rolling direction and 500 mm long in the direction orthogonal to the rolling direction was cut out from a center portion of a steel sheet in a direction (transverse direction) orthogonal to the rolling direction. By using a cutting machine 100 illustrated in FIG. 1, the test specimen 10 held between a lower blade 30 and a sheet holder 40 was sheared by bringing an upper blade 20 down. The shearing conditions were that the clearance CL was 15% of the sheet thickness t and the shear angle (the slope with respect to the sheet surface of the steel sheet) was 0°. Under such shearing conditions, the test specimen 10 was sheared five times at 30 mm intervals in the direction orthogonal to the rolling direction so as to obtain five strip-shaped test specimens 50 illustrated in FIG. 2. Each of the strip-shaped test specimens 50 had a sheared surface S1 which had been facing the upper blade 20 during shearing. Each of the five strip-shaped test specimens 50 was cut at 10 mm intervals in the rolling direction. As a result of this cutting, one strip-shaped test specimen 50 was divided into 11 pieces. The cutting positions of the strip-shaped test specimen 50 are indicated by broken lines in FIG. 3. Of the eleven pieces obtained by cutting a strip-shaped test specimen 50, ten pieces were used as observation test specimens 60. Thus, from five strip-shaped test specimens 50, a total of 50 observation test specimens 60 were taken and used in observation of edge cracks. Each of the observation test specimens 60 was polished at the sheared surface S1, and, without etching, the presence/absence of the edge cracks was observed with an optical microscope. As illustrated in FIG. 4, for each of the observation test specimens 60, the sheared surface S1 was observed from the thickness surface side in the same direction. In accordance with aspects of the present invention, any observation test specimen 60 that had one or more cracks 70 extending 30 μm or more from the sheared surface S1 in the depth direction was determined as having edge cracks. In accordance with aspects of the present invention, a steel sheet in which the ratio of the observation test specimens 60 having edge cracks was less than 50% was evaluated as having excellent edge cracking resistance. The steel sheets evaluated as having excellent edge cracking resistance are indicated by "A" in Table 3. Meanwhile, steel sheets in which the frequency of edge cracking is 50% or more were evaluated having poor edge cracking resistance. The steel sheets evaluated as having poor edge cracking resistance are indicated by "F" in Table 3.

Note that each of the observation test specimens 60 had a sheared surface which had been facing the lower blade 30 during shearing and which was on the opposite side from the sheared surface S1 which had been facing the upper blade 20 during shearing. The sheared surface that had been facing the lower blade 30 during shearing was also observed in the same manner as the sheared surface S1, and edge cracks were rarely found. Thus, in accordance with aspects of the present invention, the sheared surface S1 was used for evaluation.

(Evaluation of Bendability)

a JIS No. 3 test specimen was taken from each steel sheet such that the longitudinal direction was the direction (coil width direction) orthogonal to the rolling direction, and a 90° V bend test by a V block method was performed in accordance with JIS Z 2248 while varying the bending radius. Then the bendability was evaluated by the value (R/t) obtained by dividing the minimum bending radius R that does not generate cracks in the test specimen surface by the sheet thickness t. Here, the bend ridge direction was parallel to the rolling direction. In accordance with aspects of the present invention, a steel sheet having an R/t of 4.0 or less was evaluated as having excellent bendability, and is indicated by "A" in Table 3. Furthermore, a steel sheet having an R/t exceeding 4.0 was evaluated as having poor bendability, and is indicated by "F" in Table 3.

TABLE 3

| No. | Steel No. | Steel microstructure | | | | | | Tensile strength (MPa) | Evaluation of edge cracking resistance | Bendability | | Remarks |
|---|---|---|---|---|---|---|---|---|---|---|---|---|
| | | *1 (%) | *2 (%) | *3 (%) | *4 (carbides/mm$^2$) | Nc (grains/mm$^2$) | Ns (grains/mm$^2$) | | | Evaluation | R/t | |
| 1 | A | 100 | 0 | 0 | 0 | 14 | 9 | 1333 | A | A | 3.2 | Example |
| 2 | B | 100 | 0 | 0 | 0 | 17 | 12 | 2084 | A | A | 3.6 | Example |

TABLE 3-continued

| | | Steel microstructure | | | | | | Tensile | Evaluation of edge | Bendability | | |
|---|---|---|---|---|---|---|---|---|---|---|---|---|
| Steel No. | Steel No. | *1 (%) | *2 (%) | *3 (%) | *4 (carbides/mm$^2$) | Nc (grains/mm$^2$) | Ns (grains/mm$^2$) | strength (MPa) | cracking resistance | Evaluation | R/t | Remarks |
| 3 | C | 100 | 0 | 0 | 0 | 17 | 10 | 1683 | A | A | 3.2 | Example |
| 4 | D | 87 | 12 | 1 | 0 | 21 | 16 | 1784 | A | A | 3.2 | Example |
| 5 | E | 100 | 0 | 0 | 0 | 16 | 14 | 1878 | A | A | 3.2 | Example |
| 6 | F | 100 | 0 | 0 | 0 | 13 | 9 | 1957 | A | A | 3.9 | Example |
| 7 | G | 99 | 0 | 1 | 0 | 21 | 12 | 1933 | A | A | 3.9 | Example |
| 8 | H | 73 | 26 | 1 | 5373 | 15 | 6 | 1325 | A | A | 3.6 | Example |
| 9 | I | 100 | 0 | 0 | 0 | 23 | 13 | 1609 | A | A | 3.2 | Example |
| 10 | J | 100 | 0 | 0 | 0 | 11 | 3 | 1404 | A | A | 3.6 | Example |
| 11 | K | 97 | 0 | 3 | 0 | 26 | 22 | 1923 | A | A | 2.9 | Example |
| 12 | L | 100 | 0 | 0 | 0 | 11 | 1 | 1355 | A | A | 3.6 | Example |
| 13 | M | 100 | 0 | 0 | 51300 | 22 | 18 | 2000 | A | A | 3.9 | Example |
| 14 | N | 100 | 0 | 0 | 0 | 10 | 3 | 1512 | A | A | 3.2 | Example |
| 15 | O | 82 | 18 | 0 | 0 | 29 | 21 | 1812 | A | A | 2.9 | Example |
| 16 | P | 100 | 0 | 0 | 0 | 20 | 13 | 1883 | A | A | 3.2 | Example |
| 17 | Q | 100 | 0 | 0 | 5410 | 16 | 15 | 1459 | A | A | 3.2 | Example |
| 18 | R | 100 | 0 | 0 | 0 | 14 | 12 | 1785 | A | A | 3.2 | Example |
| 19 | S | 100 | 0 | 0 | 0 | 21 | 15 | 1298 | A | A | 3.6 | Comparative Example |
| 20 | T | 100 | 0 | 0 | 0 | 20 | 14 | 2319 | F | F | 4.3 | Comparative Example |
| 21 | U | 100 | 0 | 0 | 0 | 16 | 10 | 1755 | F | A | 3.2 | Comparative Example |
| 22 | V | 100 | 0 | 0 | 7592 | 10 | 4 | 1949 | F | A | 3.6 | Comparative Example |
| 23 | W | 100 | 0 | 0 | 2816 | 16 | 15 | 1865 | F | F | 6.1 | Comparative Example |
| 24 | X | 100 | 0 | 0 | 0 | 12 | 10 | 2009 | A | F | 5.0 | Comparative Example |
| 25 | Y | 100 | 0 | 0 | 0 | 18 | 16 | 1842 | A | F | 5.7 | Comparative Example |
| 26 | Z | 100 | 0 | 0 | 0 | 7 | 6 | 1643 | F | A | 3.2 | Comparative Example |
| 27 | AA | 100 | 0 | 0 | 0 | 9 | 6 | 1709 | F | A | 2.9 | Comparative Example |
| 28 | AB | 100 | 0 | 0 | 0 | 29 | 28 | 2047 | A | F | 4.3 | Comparative Example |
| 29 | AC | 99 | 0 | 1 | 1609 | 30 | 29 | 1735 | A | F | 4.6 | Comparative Example |
| 30 | AD | 100 | 0 | 0 | 5587 | 29 | 28 | 1797 | A | F | 4.6 | Comparative Example |
| 31 | A | 95 | 0 | 5 | 0 | 9 | 2 | 1331 | F | A | 3.2 | Comparative Example |
| 32 | A | 100 | 0 | 0 | 0 | 10 | 5 | 1323 | A | A | 3.2 | Example |
| 33 | K | 97 | 0 | 3 | 0 | 25 | 30 | 1914 | A | F | 4.3 | Comparative Example |
| 34 | C | 100 | 0 | 0 | 0 | 4 | 6 | 1685 | F | A | 3.6 | Comparative Example |
| 35 | C | 62 | 0 | 38 | 33915 | 18 | 5 | 1123 | A | A | 3.9 | Comparative Example |
| 36 | C | 69 | 0 | 31 | 0 | 15 | 15 | 1148 | A | A | 3.2 | Comparative Example |
| 37 | I | 66 | 0 | 34 | 9140 | 16 | 13 | 1164 | A | A | 3.6 | Comparative Example |
| 38 | O | 67 | 33 | 0 | 0 | 27 | 19 | 1269 | A | A | 3.2 | Comparative Example |
| 39 | P | 100 | 0 | 0 | 79800 | 10 | 8 | 1779 | A | F | 4.3 | Comparative Example |
| 42 | AE | 100 | 0 | 0 | 0 | 15 | 9 | 1506 | A | A | 3.2 | Example |
| 43 | AF | 64 | 0 | 36 | 0 | 16 | 12 | 1164 | A | A | 3.2 | Comparative Example |
| 44 | O | 100 | 0 | 0 | 36480 | 31 | 28 | 1165 | A | F | 4.2 | Comparative Example |
| 45 | O | 100 | 0 | 0 | 0 | 25 | 27 | 1166 | A | A | 3.9 | Comparative Example |

*1: Area ratio of martensite.
*2: Area ratio of bainite.
*3: Total area ratio of ferrite and retained austenite.
*4: Number density of carbides having long axes of 0.5 μm or more at the 1/4 thickness position of the steel sheet.
Nc: Number density of inclusion grains having equivalent circle diameters of 4.0 μm or more in the 1/4-to-3/4 thickness region of the steel sheet.
Ns: Number density of inclusion grains having equivalent circle diameters of 4.0 μm or more in the surface-to-1/4 thickness region of the steel sheet.

The steel sheets of examples of the present invention have a tensile strength of 1310 MPa or higher and excellent edge cracking resistance and bendability. In contrast, steel sheets of Comparative Examples are inferior to Examples in at least one of the items.

Example 2

A steel sheet produced under the production condition No. 1 (Example) in Table 2 in Example 1 was galvanized, and the galvanized steel sheet was press-formed to produce a member of Example of the present invention. Furthermore, a steel sheet produced under the production condition No. 1 (Example) in Table 2 in Example 1 was galvanized, a steel sheet produced under the production condition No. 2 (Example) in Table 2 in Example 1 was galvanized, and these galvanized steel sheets were spot-welded to produce a member of Example of the present invention. These members of Examples were rated "A" for the edge cracking resistance and "A" for bendability described above, and this shows that these members are suitable for use in automotive parts and the like.

In the same manner, a steel sheet produced under the production condition No. 1 (Example) in Table 2 in Example 1 was press-formed to produce a member of Example of the present invention. Furthermore, a steel sheet produced under the production condition No. 1 (Example) in Table 2 in Example 1 and a steel sheet produced under the production condition No. 2 (Example) in Table 2 in Example 1 were spot-welded to produce a member of Example of the present invention. These members of Examples were rated "A" for the edge cracking resistance and "A" for bendability described above, and this shows that these members are suitable for use in automotive parts and the like.

REFERENCE SIGNS LIST

10 test specimen
20 upper blade 30 lower blade
40 sheet holder
50 strip-shaped test specimen
60 observation test specimen
70 crack
100 cutting machine
CL clearance
t sheet thickness

The invention claimed is:

1. A steel sheet having a tensile strength of 1310 MPa or higher, the steel sheet comprising:
a chemical composition containing, in terms of mass %,
C: 0.12% or more and 0.40% or less,
Si: 0.01% or more and 1.5% or less,
Mn: 0.2% or more and 1.7% or less,
P: 0.05% or less,
S: 0.010% or less,
sol. Al: 1.00% or less,
N: 0.010% or less,
B: 0.0002% or more and 0.0050% or less,
at least one selected from Nb and Ti: 0.010% or more and 0.080% or less in total, and the balance being Fe and incidental impurities; and
a steel microstructure containing martensite at an area ratio of 70% or more, bainite at an area ratio of 30% or less, and ferrite and retained austenite at a total area ratio of 5% or less,
wherein:
at a 1/4 thickness position of the steel sheet, a number density of carbides having long axes of 0.5 μm or more is 60000 carbides/mm$^2$ or less, in a ¼-to-¾ thickness region of the steel sheet, a number density of inclusion grains having equivalent circle diameters of 4.0 μm or more is 10 grains/mm$^2$ or more and 30 grains/mm2 or less, and in a surface-to-¼ thickness region of the steel sheet, a number density of inclusion grains having equivalent circle diameters of 4.0 μm or more is 27 grains/mm$^2$ or less.

2. The steel sheet according to claim 1, wherein the chemical composition further includes, in terms of mass %, at least one selected from the group consisting of:
Mo: 0.350% or less,
Cr: 0.350% or less,
Zr: 0.350% or less,
Ca: 0.0050% or less,
V: 0.500% or less,
W: 0.200% or less,
Cu: 1.00% or less,
Ni: 1.00% or less,
Sb: 0.100% or less,
Sn: 0.100% or less,
Mg: 0.01% or less, and
REM: 0.01% or less.

3. The steel sheet according to claim 2, wherein a coating layer is disposed on a surface of the steel sheet.

4. The steel sheet according to claim 1, wherein a coating layer is disposed on a surface of the steel sheet.

5. A member obtained by subjecting the steel sheet according to claim 1 to at least one selected from forming and welding.

6. A member obtained by subjecting the steel sheet according to claim 2 to at least one selected from forming and welding.

7. A member obtained by subjecting the steel sheet according to claim 4 to at least one selected from forming and welding.

8. A member obtained by subjecting the steel sheet according to claim 3 to at least one selected from forming and welding.

9. A method for producing a steel sheet, the method comprising:
a slab heating step that involves heating a slab having the chemical composition according to Claim 1 under such conditions that an average heating rate in a slab surface temperature range from 300° C. to 1220° C. is 0.10° C./s or more and that an average temperature ratio (Tc/Ts) of a slab center temperature Tc to a slab surface temperature Ts in this temperature range is 0.85 or less, and then holding the resulting slab under such conditions that a slab surface temperature of 1220° C. or higher is held for 30 minutes or longer and a slab center temperature of 1220° C. or higher is held for 30 minutes or shorter;
a hot rolling step of hot-rolling the slab that has been subjected to the slab heating step so as to produce a hot rolled steel sheet;
a cold rolling step of cold-rolling the hot rolled steel sheet into a cold rolled steel sheet; and
an annealing step of holding the cold rolled steel sheet at an annealing temperature of 800° C. or higher for 240 seconds or longer, then cooling the annealed steel sheet at an average cooling rate of 70° C./s or more in a temperature range from a cooling start temperature of 680° C. or higher to 300° C., and then holding the resulting steel sheet in a temperature range of 150° C. or higher and 260° C. or lower for 20 seconds or longer and 1500 seconds or shorter.

10. The method for producing a steel sheet according to claim 9, further comprising a coating step of coating a surface of the steel sheet after the annealing step.

11. A method for producing a member, the method comprising a step of subjecting a steel sheet produced by the method for producing a steel sheet according to claim 10 to at least one selected from forming and welding.

12. A method for producing a member, the method comprising a step of subjecting a steel sheet produced by the method for producing a steel sheet according to claim 9 to at least one selected from forming and welding.

13. A method for producing a steel sheet, the method comprising:
a slab heating step that involves heating a slab having the chemical composition according to Claim 2 under such conditions that an average heating rate in a slab surface temperature range from 300° C. to 1220° C. is 0.10° C./s or more and that an average temperature ratio (Tc/Ts) of a slab center temperature Tc to a slab surface temperature Ts in this temperature range is 0.85 or less, and then holding the resulting slab under such conditions that a slab surface temperature of 1220° C. or higher is held for 30 minutes or longer and a slab center temperature of 1220° C. or higher is held for 30 minutes or shorter;
a hot rolling step of hot-rolling the slab that has been subjected to the slab heating step so as to produce a hot rolled steel sheet;
a cold rolling step of cold-rolling the hot rolled steel sheet into a cold rolled steel sheet; and
an annealing step of holding the cold rolled steel sheet at an annealing temperature of 800° C. or higher for 240 seconds or longer, then cooling the annealed steel sheet at an average cooling rate of 70° C./s or more in a temperature range from a cooling start temperature of 680° C. or higher to 300° C., and then holding the resulting steel sheet in a temperature range of 150° C. or higher and 260° C. or lower for 20 seconds or longer and 1500 seconds or shorter.

14. The method for producing a steel sheet according to claim 13, further comprising a coating step of coating a surface of the steel sheet after the annealing step.

15. A method for producing a member, the method comprising a step of subjecting a steel sheet produced by the method for producing a steel sheet according to claim 14 to at least one selected from forming and welding.

16. A method for producing a member, the method comprising a step of subjecting a steel sheet produced by the method for producing a steel sheet according to claim 13 to at least one selected from forming and welding.

\* \* \* \* \*

UNITED STATES PATENT AND TRADEMARK OFFICE
CERTIFICATE OF CORRECTION

PATENT NO. : 12,378,625 B2  
APPLICATION NO. : 17/794418  
DATED : August 5, 2025  
INVENTOR(S) : Shimpei Yoshioka, Shinjiro Kaneko and Yuma Honda It is certified that error appears in the above-identified patent and that said Letters Patent is hereby corrected as shown below:

In the Claims

In Column 27, Line 35 in Claim 1, the phrase "grains/mm2" should read -- grains/mm$^2$ --.

Signed and Sealed this  
Eighteenth Day of November, 2025

John A. Squires  
*Director of the United States Patent and Trademark Office*